(12) United States Patent
Coull

(10) Patent No.: US 8,888,421 B1
(45) Date of Patent: Nov. 18, 2014

(54) PICKUP TRUNK

(71) Applicant: Dennis Coull, Peterborough (CA)

(72) Inventor: Dennis Coull, Peterborough (CA)

( * ) Notice: Subject to any disclaimer, the term of this patent is extended or adjusted under 35 U.S.C. 154(b) by 0 days.

(21) Appl. No.: 14/050,074

(22) Filed: Oct. 9, 2013

(51) Int. Cl.
*B60P 1/64* (2006.01)

(52) U.S. Cl.
USPC .......................................... 410/52

(58) Field of Classification Search
USPC .............. 410/52; 296/37.1, 37.5, 37.8, 37.14, 296/37.16, 24.4, 24.43; 224/545, 548, 549, 224/400
See application file for complete search history.

(56) References Cited

U.S. PATENT DOCUMENTS

| | | | |
|---|---|---|---|
| 4,538,737 A * | 9/1985 | Delaney ...................... | 211/71.01 |
| 5,484,091 A * | 1/1996 | Malinowski et al. .......... | 224/542 |
| 5,598,962 A | 2/1997 | Schlachter | |
| 5,601,271 A | 2/1997 | Carter et al. | |
| 5,603,439 A * | 2/1997 | Pineda .......................... | 224/403 |
| 5,979,725 A * | 11/1999 | Lehrman ....................... | 224/539 |
| 6,443,544 B1 * | 9/2002 | Wolf et al. ................... | 312/348.1 |
| 7,201,421 B2 * | 4/2007 | Reynolds et al. ............. | 296/37.5 |
| 8,215,693 B2 * | 7/2012 | Ulita ............................. | 296/37.1 |
| 2003/0206782 A1 | 11/2003 | Toglia | |
| 2006/0022479 A1 | 2/2006 | Mulvihill et al. | |
| 2010/0270821 A1 | 10/2010 | Ulita | |

* cited by examiner

*Primary Examiner* — H Gutman
(74) *Attorney, Agent, or Firm* — Thien Tran, Esq; Access Patent Group, LLC

(57) ABSTRACT

A pickup trunk is provided for a pickup truck having a bed with side walls and a tailgate. The pickup trunk includes a holder to receive cargo therein. A manually adjustable retainer mechanism is for retaining the holder with the cargo in a stationary position on a back portion of the bed between the side walls of the pickup truck adjacent to the tailgate, so as to allow for easy access and retrieval of the cargo from the holder when the tailgate is opened.

8 Claims, 8 Drawing Sheets

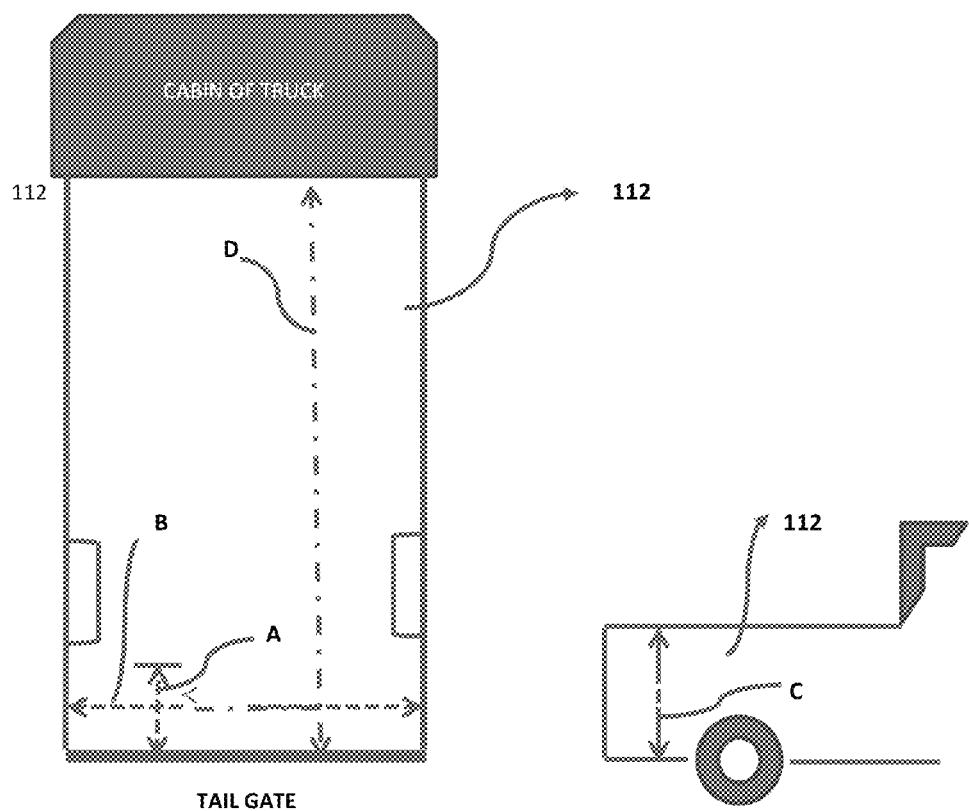
FIGURE 6A                    FIGURE 6B

PICKUP TRUNK

BACKGROUND OF THE INVENTION

1. Field of the Invention

The present invention relates to cargo securing systems, and more particularly, a pickup trunk.

It can be difficult for pickup truck owners or van owners to place cargo, such as groceries, luggage, or coolers, in the back of their truck or van and drive off without the cargo shifting around. When people arrive at their destination, they have to open the tailgate, crawl into the bed, and retrieve their scattered items. This can be a hassle, time consuming, and highly inconvenient. Additionally, the truck bed or the cargo can become damaged as a result. An effective solution is necessary.

The pickup trunk provides people with an easy and convenient way to keep cargo in the back portion of a pickup truck bed, closest to the tailgate, for easy access and retrieval. The present invention is an adjustable holder that spans the width of the pickup truck bed from side to side. Pickup truck owners can place items, such as groceries, coolers, luggage, or equipment, into the holder and then drive without having to worry about the items shifting all over the back of the truck. When unloading, they may simply open the tailgate and grab the items. The pickup trunk is ideal for van owners as well.

2. Description of the Prior Art

Numerous innovations for cargo restraining systems for vehicles have been provided in the prior art that will be described. Even though these innovations may be suitable for the specific individual purposes to which they address, however, they differ from the present invention.

A FIRST EXAMPLE, U.S. Pat. No. 5,598,962, issued on Feb. 4, 1997, to Schlachter teaches a removable security trunk for a motor vehicle such as a station wagon, van or sport-utility type vehicle having a relatively large rear access opening with a width less than the width between the sidewalls or trim panels of a rear cargo compartment in the vehicle. The security trunk includes opposed longitudinally extending support members which may be secured to the compartment sidewalls for supporting a generally horizontally extending top panel for sliding movement into and out of the vehicle rear access opening at the reduced width portion. One or more vertically extending fore and aft partitions extend between the top panel and the compartment support deck for providing multiple storage compartments and for supporting the top panel. The partitions may be disconnected from the top panel whereby three generally planar members may be easily stored in or out of the vehicle. An alternate embodiment comprises vertical sidewall support members and a floor member secured to a generally horizontal top panel whereby a somewhat box-like enclosure may be inserted in and removed from the vehicle cargo compartment while providing, in its working position, a security closure to prevent viewing or access to articles in the vehicle cargo compartment except through a liftgate, tailgate or rear doors.

A SECOND EXAMPLE, U.S. Pat. No. 5,601,271, issued on Feb. 11, 1997, to Janowski et al. teaches an easy to use cargo restraining barrier device designed to keep items in a cargo area from moving around. The cargo restraining barrier is comprised of a vertical wall having peripheral flanges to hold and restrain packages. The flanges are provided with Velcro hook-type material to securely grip carpeting in a cargo storage area such as the trunk of a car. The flanges surrounding the vertical wall on the cargo restraining barrier also includes spikes, and are constructed to use the shape and weight of packages, boxes, food items or other items to hold the barriers in position. In the preferred embodiment the vertical wall and flanges are of a molded hollow plastic construction allowing multiple cargo restraining barriers to be stacked for storage. Optional embodiments provide hinged sections that fold to provide a vertical wall and flanges, and when unfolded, lie flat for storage.

A THIRD EXAMPLE, U.S. Patent Office Publication No. 2003,0206782, published on Nov. 6, 2003, to Toglia teaches an easy to use cargo restraining barrier device designed to keep fragile or spillable items in a vehicle's trunk or cargo area from sliding or tipping during transport. This versatile device is comprised of a length of flexible material of any cross-sectional shape that will fit snuggly against cargo and restrain it from undesirable movement. This barrier device is placed in position by the user to restrain cargo and is secured to trunk or cargo area carpet via Velcro hook-type pads bonded at intervals to the barrier's underside. The versatility of this device is derived from its flexible construction and its ability to conform to the various shapes of cargo items which is a distinct advantage over prior art. The simplicity of construction of this device offers potential economic advantages in cost to manufacture over prior art.

A FOURTH EXAMPLE, U.S. Patent Office Publication No. 2006/0022479, published on Feb. 2, 2006, to Mulvihill et al. teaches an integrated storage system for vehicles which includes an expandable container secured to and extendable from a vertical panel of the vehicle to at least one predetermined position to accommodate cargo. The container is collapsible so that it is substantially flush with the vertical panel when not in use and may be made of fabric or netting, for example. A semi-rigid end panel with a handle may be secured to the container to facilitate deploying and stowing the container. Depending on the application, the container may be removable from the vehicle to transport cargo. The storage system may be integrated into various locations including a cargo area, behind a seat or seats, in a truck bed, or in the trunk of a vehicle, for example.

A FIFTH EXAMPLE, U.S. Patent Office Publication No. 2010/0270821, published on Oct. 28, 2010, to Ulita teaches a vehicle trunk compartment cargo management system that is comprised of a trunk floor panel, a seatback and a pair of dividers. The trunk floor panel provides a vehicle trunk compartment floor surface. The seatback has a pair of pockets. Each pocket secures a seatback flange extending from a divider oriented in an upright position. Each divider has a seatback flange which fits within a seatback pocket to secure the divider in an upright position to the seatback. The dividers are pivotally attached to the trunk floor panel such that they may pivot between an upright position and a horizontally closed position. When the dividers are locked into an upright position they form three sub compartments within the vehicle trunk compartment. An optional cargo net fits over the dividers to cover the sub compartments.

It is apparent now that numerous innovations for cargo restraining systems for vehicles have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a pickup trunk that avoids the disadvantages of the prior art.

ANOTHER OBJECT of the present invention is to provide a pickup trunk that is simple and inexpensive to manufacture.

STILL ANOTHER OBJECT of the present invention is to provide a pickup trunk that is simple to use.

BRIEFLY STATED, STILL YET ANOTHER OBJECT of the present invention is to provide a pickup trunk for a pickup truck having a flatbed with side walls and a tailgate. The pickup trunk comprises a holder to receive cargo therein. A manually adjustable retainer mechanism is for retaining the holder with the cargo in a stationary position on a back portion of the flatbed between the side walls of the pickup truck adjacent to the tailgate, so as to allow for easy access and retrieval of the cargo from the holder when the tailgate is opened.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 6A shows the measurements of some pickup vehicles: tailgate width A, width B of pickup or equal to the length of the tailgate, and the length D;

FIG. 6B shows the height C of the pickup sidewalls;

Figure 1:
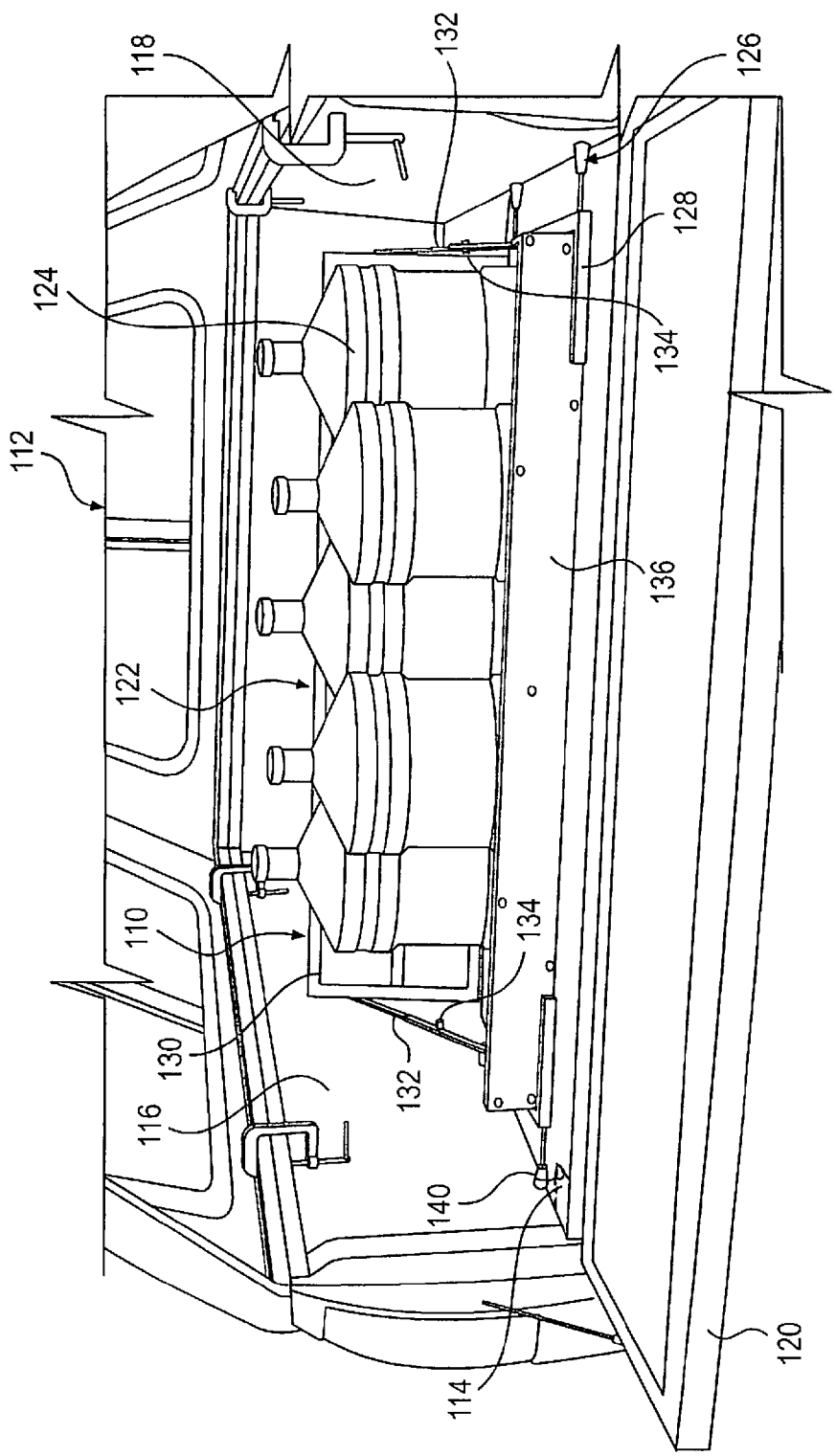
FIG. 1 is a rear perspective view of the present invention retaining cargo on a flatbed of a pickup truck.

REFERENCE NUMERALS UTILIZED IN THE DRAWING 110 pickup trunk
112 pickup truck
114 flatbed of pickup truck 112
116 side wall of bed 114
118 side wall of bed 114
120 tailgate of pickup truck 112
122 holder of pickup trunk 110
124 cargo
126 A-B-C-D manually adjustable retaining mechanism of pickup trunk 110
128 base frame of holder 122
130 hinged top panel of holder 122
132 support arm of top panel 130
134 pin of support arm 132
136 front retainer bar of holder 122
138 drop rail of holder 122
140 hollow receiver at each corner of the base frame

DETAILED DESCRIPTION OF THE PREFERRED EMBODIMENT

As shown in FIG. 1, the present invention is a pickup trunk 110 for a pickup truck 112 having a bed 114 with side walls 116, 118 and a tailgate 120. The pickup trunk 110 comprises a holder 122 to receive cargo 124 therein. A manually adjustable retainer mechanism 126 A-B-C-D is for retaining the holder 122 with the cargo 124 in a stationary position on a back portion of the bed 114 between the side walls 116, 118 of the pickup truck 112 adjacent to the tailgate 120, so as to allow for easy access and retrieval of the cargo 124 from the holder 122 when the tailgate 120 is opened.

Figure 2:
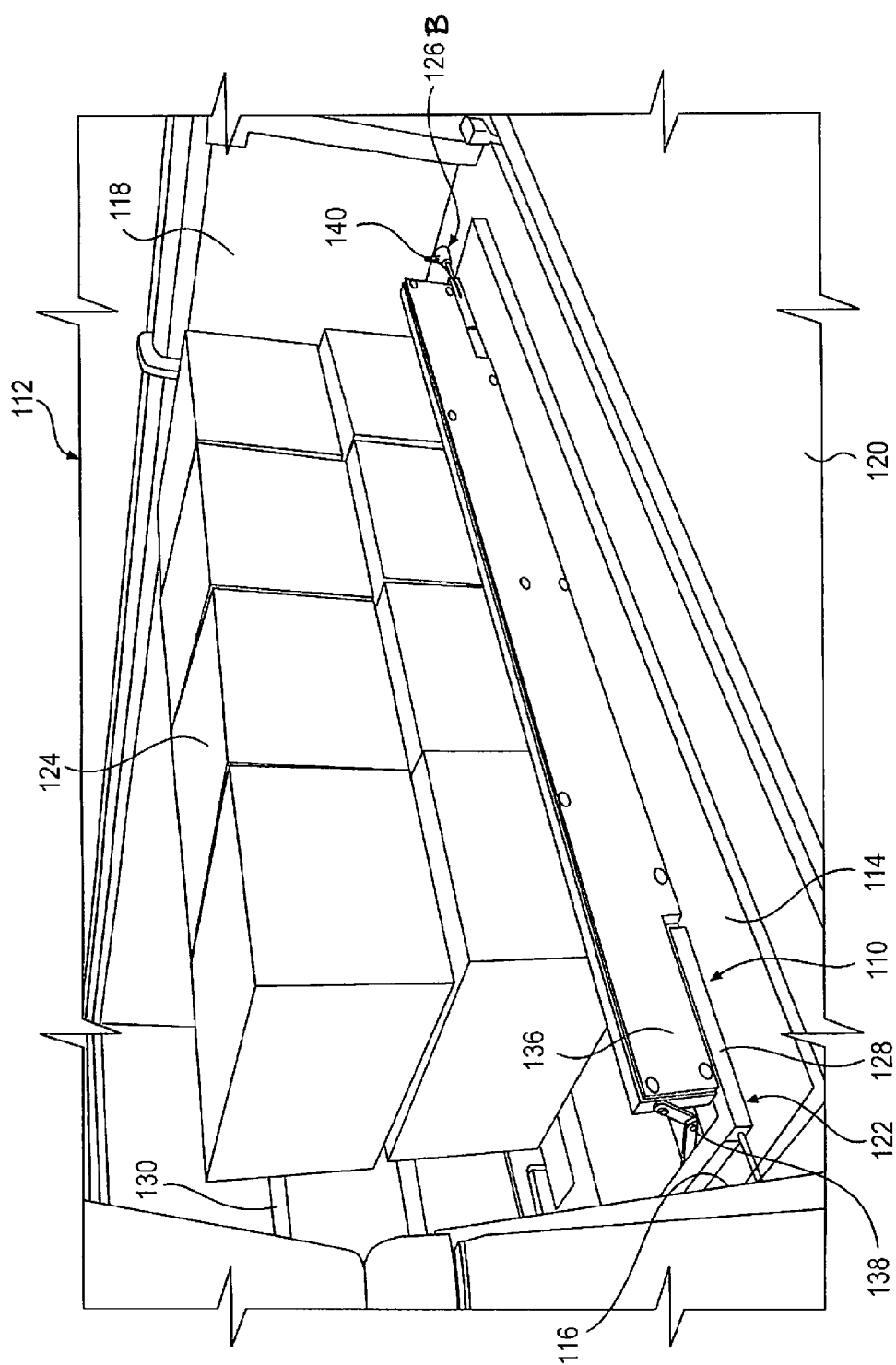
FIG. 2 is a left rear perspective view of the present invention retaining cargo on the flatbed of the pickup truck.

As shown in FIG. 2, the holder 122 comprises a base frame 128 and a hinged top panel 130 hinged to back of the base frame 128. The hinged top panel 130 can go from a closed position to an upright open position, so that the base frame 128 can receive and retain the cargo 124.

Figure 3:
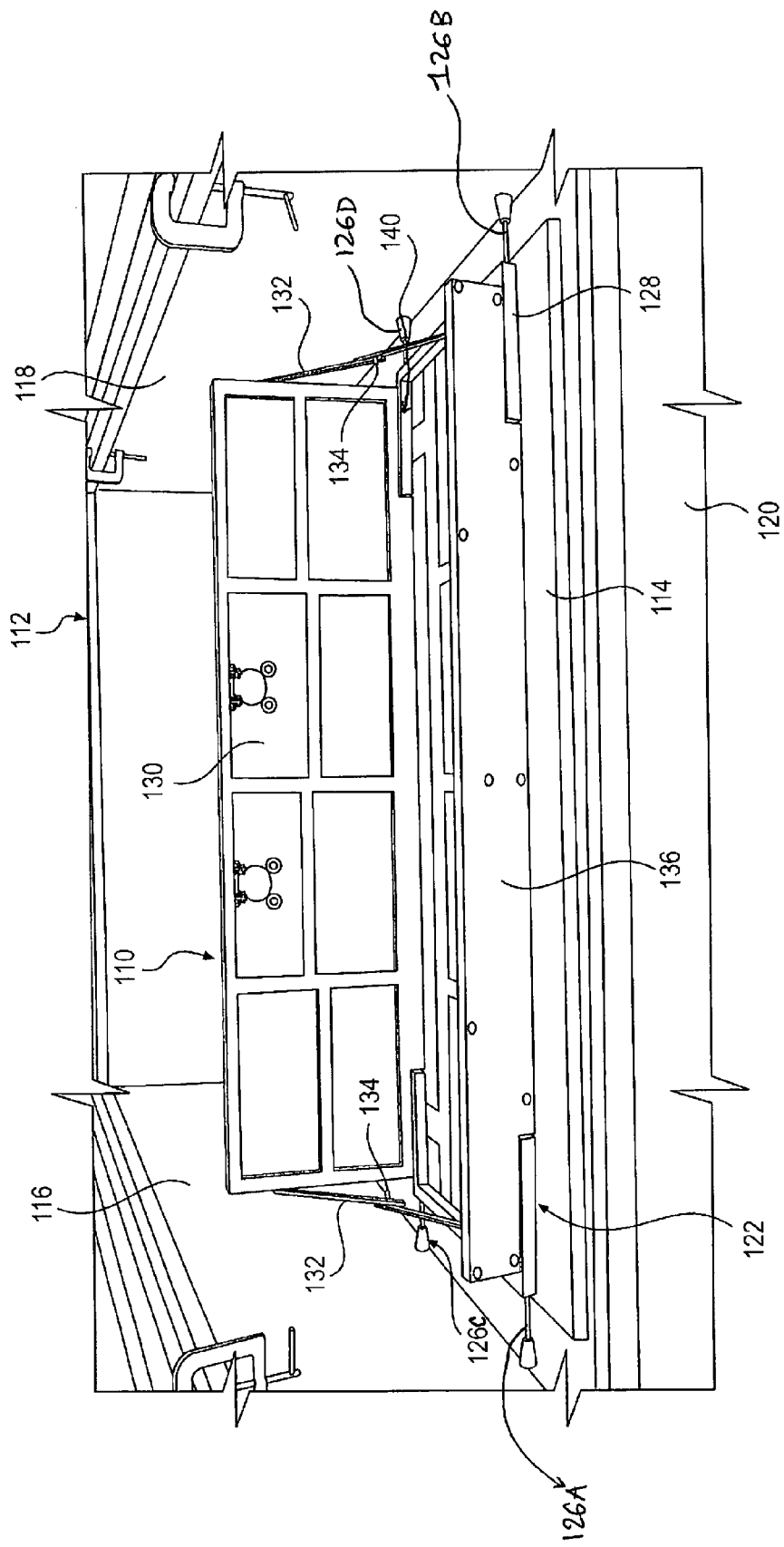
FIG. 3 is a rear perspective view of the present invention opened on the flatbed of the pickup truck.

As shown in FIG. 3, the holder 122 further comprises a pair of support arms 132. Each support arm 132 is connected between one side of the base frame 128 and the hinged top panel 130. A pair of pins 134 is also provided. Each pin 134 is placed through one support arm 132 to lock the hinged top panel 130 in the upright open position.

Figure 4:
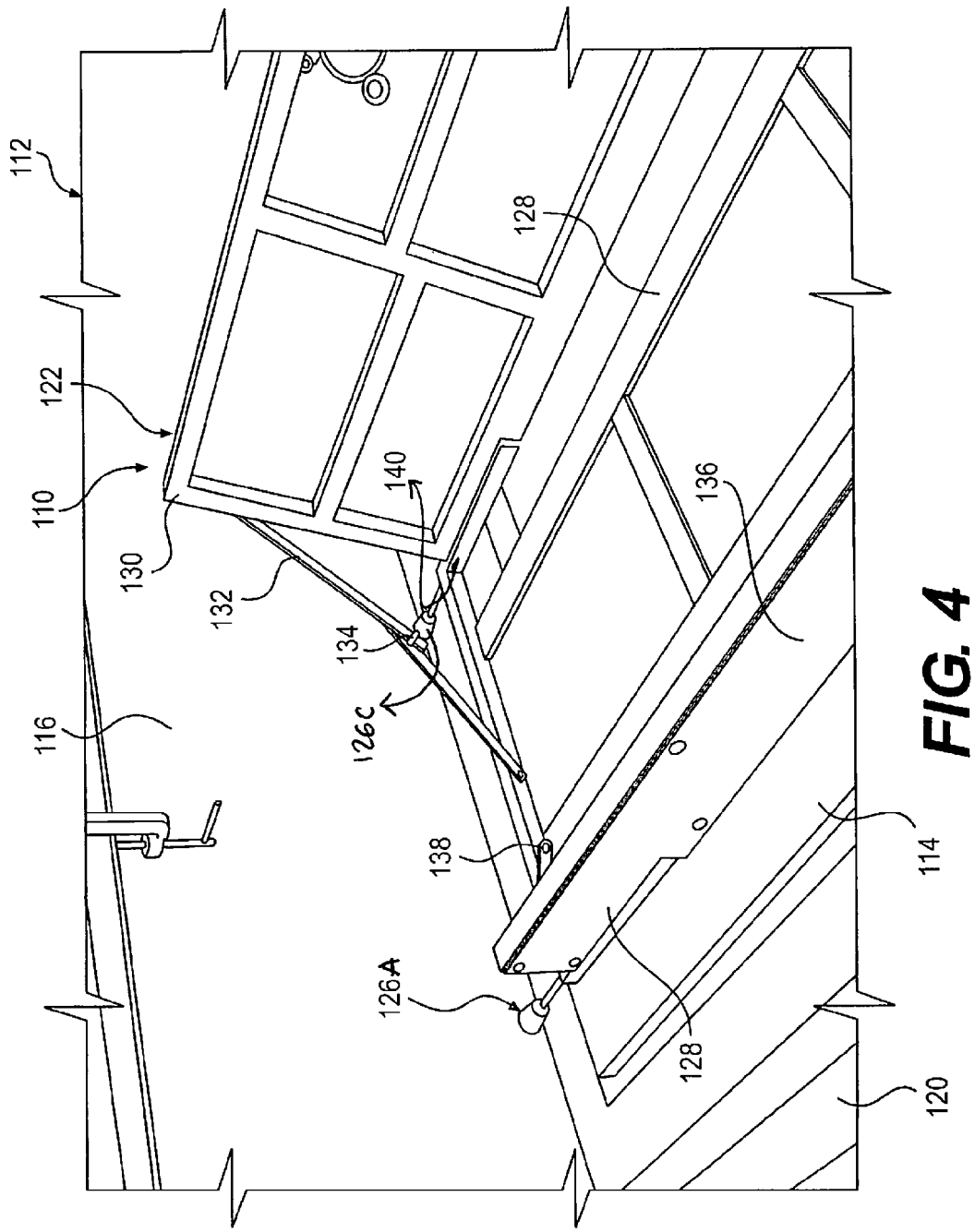
FIG. 4 is a partial right rear perspective view of the present invention opened on the flatbed of the pickup truck.

As shown in FIG. 4, the holder 122 further comprises a front retainer bar 136 and a pair of drop rails 138. Each drop rail 138 is connected between one side of the front retainer bar 136 and a front side of the base frame 128. The front retainer bar 136 can go from a horizontally closed position to an upright open position to help the base frame 128 to receive and position the cargo 124 in place.

Figure 5:
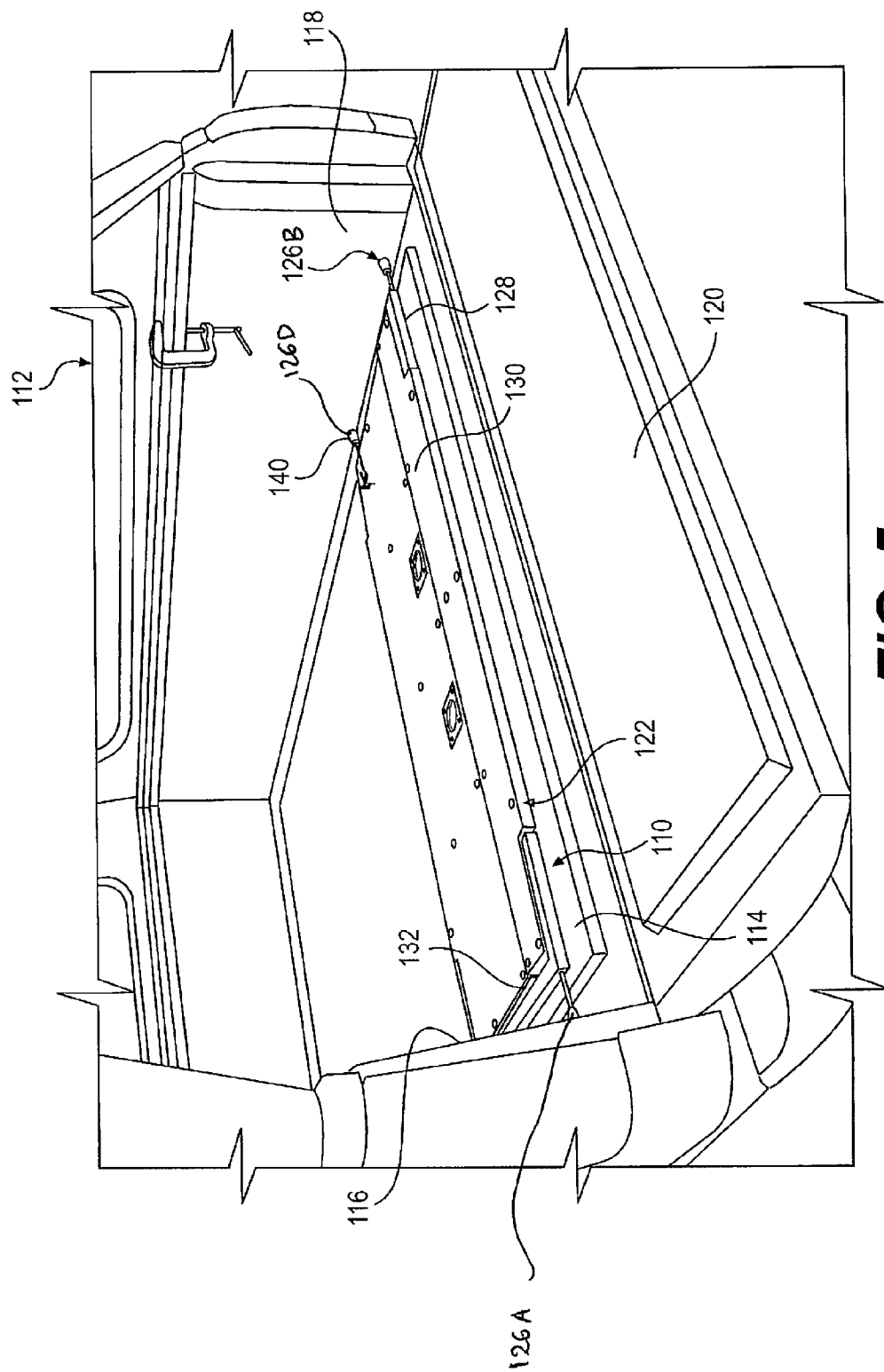
FIG. 5 is a left rear perspective view of the present invention closed on the flatbed of the pickup truck.

As shown in FIG. 5, the manually adjustable retaining mechanism 126 A-B-C-D comprises four manually adjustable retainer mechanism 126 A-B-C-D for retaining the holder 122 with the cargo 124 in a stationary position on a back portion of the bed 114 between the side walls 116, 118 of the pickup truck 112 adjacent to the tailgate 120, so as to allow for easy access and retrieval of the cargo 124 from the holder 122 when the tailgate 120 is opened. The hinged top panel 130 is in a closed position (horizontal position). The front retainer bar 136 is also in closed position (horizontal position).

As shown in FIG. 6A: the measurements of some pickup vehicles 112: tailgate width A, width B of pickup or equal to the length of the tailgate, and the length D (see table 1).

As shown in FIG. 6B: the height C of the pickup sidewalls (see table 1).

The pickup trunk 112 can be used with the following dimensional measurements (in inches):

TABLE 1

| dimensional measurements in inches | | | | | | |
|---|---|---|---|---|---|---|
| DOES IT HAS LINER | YEAR | VEHICLE | A (inches) | B (inches) | C (inches) | D (inches) |
| YES | 2007 | GMC OFF RD | 23 | 54 | 17 | 58 |
| YES | 2011 | CHEV SIERRA | 20 | 61-62 | 20 | 67 |
| YES | 2011 | FORD FISO | 20 | 62 | 20 | 76 |
| NO | 2006 | FORD RANGER | 20 | 52 | 16 | 70 |

TABLE 1-continued dimensional measurements in inches

| DOES IT HAS LINER | YEAR | VEHICLE | A (inches) | B (inches) | C (inches) | D (inches) |
|---|---|---|---|---|---|---|
| NO | 2004 | DODGE RAM | 20 | 62-63 | 19 | 73 |
| YES | 2008 | DODGE DAKOTA | 21 | 55 | 16 | 60 |
| YES | 2009 | GMC SIERRA | 20 | 61 | 20 | 76 |
| YES | 2009 | FORD 150 | 20 | 60 | 20 | 94 |

Figure 7A:
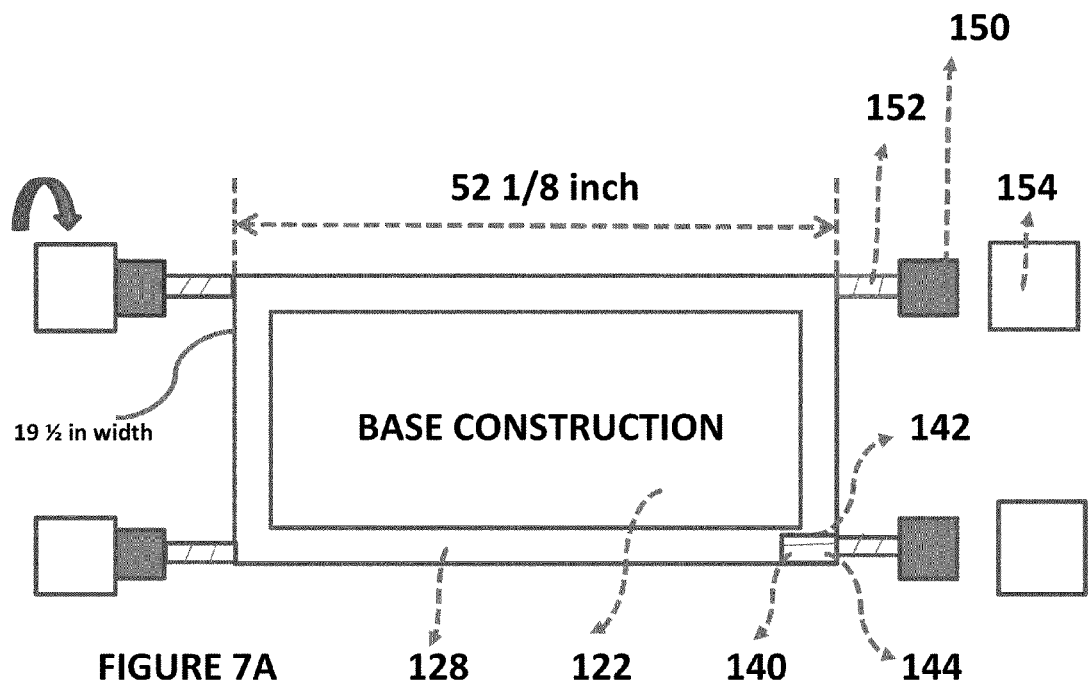
FIG. 7A shows a base construction with manually adjustable retainer mechanism at four corners.

As shown in FIG. 7A: a base construction with manually adjustable retainer mechanism at hollow receiver 140 at four corners with each welded to one 7/8" inch tubing assembly 144 which each receives a 8 inch of 3/8" threaded rod 152 and a 3/8" inch threaded hexagon-shaped coupling nut 150. Four silicon rubber chair leg tips 154 are coupled with each 7/8" inch tubing assembly 144 via each 3/8" inch threaded hexagon-shaped coupling nut 150, and each 8 inch of 3/8" threaded rod 152. Then, each or all of four silicon rubber chair leg tip is manually adjustable (by rotating along the threaded rod 152) to make the pickup trunk 110 or holder 122 strongly fit into the flatbed 114 and against both sidewalls 116-118 of the vehicle 112. The total length between rubber chair leg tips can be adjusted from 54 inches into 63 inches.

Figure 7B:
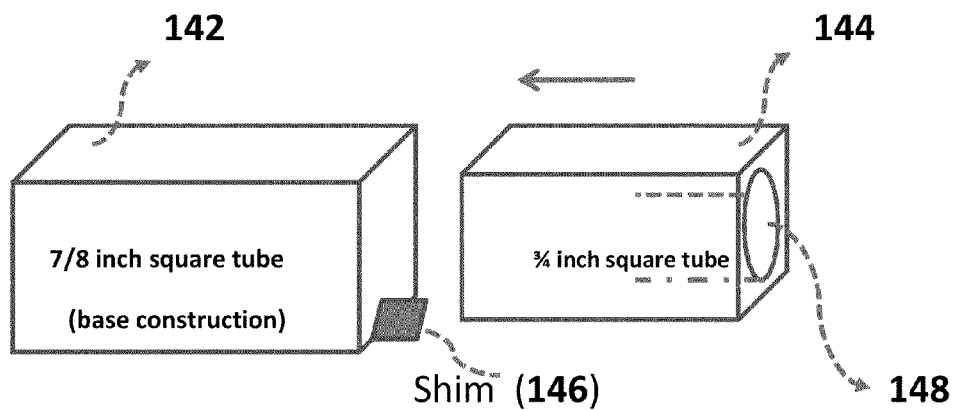
FIG. 7B shows ⅞ inch square tube at four corner of base construction with insertable ¾ inch square tube.

FIG. 7B shows said 7/8 inch square tube 142 at four receiver for each hollow corner of base construction (52 1/8 inch in length) with each insertable 3/4 or 7/8 inch square tube 144 with inner threads 148. The tube 142 also has a shim 146.

Figure 7C:
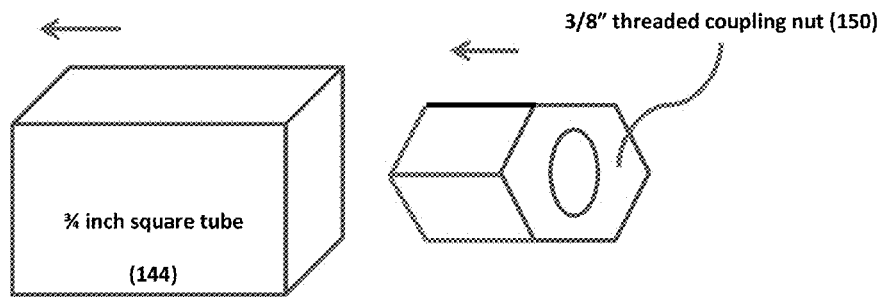
FIG. 7C shows a ⅜" threaded hexagon-shaped coupling nut.

As shown in FIG. 7C: a 3/8" threaded hexagon-shaped coupling nut 150 is adjacent to the 3/4 inch square tube 144.

Figure 7D:
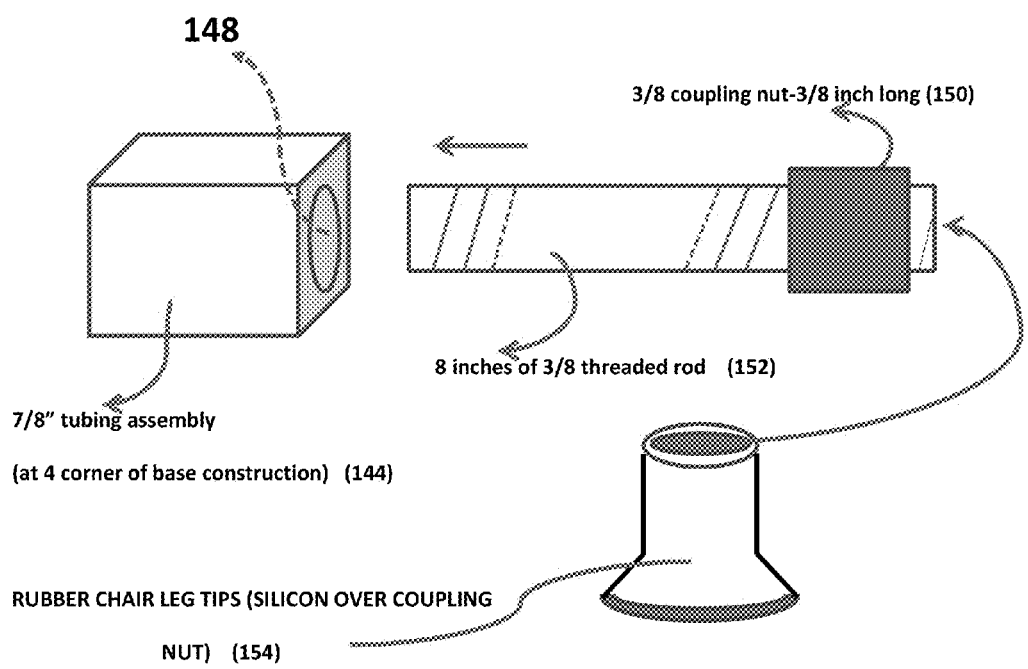
FIG. 7D shows a silicon rubber chair leg tip coupled with threaded hexagon-shaped coupling nut via a threaded rod.

As shown in FIG. 7D: a silicon rubber chair leg tip 154 is coupled with said 7/8" inch tubing assembly 144 via said 3/8" inch threaded hexagon-shaped coupling nut 150, and a 8 inch of 3/8" threaded rod 152. Each or all of four silicon rubber chair leg tip is manually adjustable (by rotating along the threaded rod 152) to make the pickup trunk 110 or holder 122 strongly fit into the flatbed 114 and against both sidewalls 116-118 of the vehicle 112.

In sum, the pickup trunk 110 allows pickup truck 112 and van owners to keep the cargo 124 in a secured, contained place, preventing it from shifting while in transit. The base frame 128 of the holder 122 with the hinged top panel 130 can be placed in the back one-third of the bed 114 of the pickup truck 112, closest to the tailgate 120. The holder 122 can span the width of the bed 114 of the pickup truck 112, from side wall 116 to side wall 118, and secured to the bed 114 via the manually adjustable retainer mechanism 126 A-B-C-D. There are support arms 132 that connect to the sides of the hinged top panel 130 and the base frame 128 of the holder 122. When the hinged top panel 130 is open, pins 134 can be placed through the support arms 132 to lock the hinged top panel 130 in an upright position. Drop rails 138 are connected between the sides of the front retainer bar 136 and the front sides of the base frame 128. People may then load the holder 122 as needed with cargo 124, water bottles, cardboard containers, . . . etc. . . . The entire holder 122 may measure approximately 52 1/8" by 19 1/2" and may be made from 3/4" square tube steel, 1/2" tube steel, or 3/4" round tube steel.

The exact specifications may vary upon manufacturing.

It will be understood that each of the elements described above, or two or more together, may also find a useful application in other types of constructions differing from the types described above.

While the invention has been illustrated and described as embodiments of a pickup trunk, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A pickup trunk for a pickup truck having a flatbed with two side walls and a tailgate, the pickup trunk comprising:
   a) a rectangular base holder to receive cargo therein;
   b) one hollow receiver, at each corner of the base holder, each hollow receiver being welded to one 7/8" inch wide tube for receiving a 3/8" diameter threaded rod 8 inches long;
   c) means for manually adjustably retaining the holder with the cargo in a stationary position on a back portion of the flatbed between the side walls of the pickup truck adjacent to the tailgate, so as to allow for easy access and retrieval of the cargo from the holder when the tailgate is opened; and
   d) a top panel hinged to a back of a base frame of the base holder, whereby the top panel can go from a horizontally closed position to an upright open position, so that the base holder can receive and retain the cargo.

2. The pickup trunk as recited in claim 1, wherein the holder further comprises:
   a) a pair of support arms, in which each support arm is connected between one side of the base frame and the hinged top panel; and
   b) a pair of pins, in which each pin is placed through one said support arm to lock the hinged top panel in the upright open position.

3. The pickup truck as recited in claim 1, wherein the holder further comprises:
   a) a front retainer bar; and
   b) a pair of drop rails, in which each drop rail is connected between one side of the retainer bar and a front side of the base frame, whereby the front retainer bar can go from a horizontally closed position to an upright open position to help the base frame to receive and position the cargo in place.

4. The pickup trunk as recited in claim 1, wherein the manually adjustable means further comprises four 3/8" threaded hexagon-shaped coupling nuts and four silicon rubber chair leg tips which each are coupled with each said 7/8" wide tube via one said 3/8" diameter threaded rod in order to abut against the two side walls of the pickup truck.

5. The pickup trunk as recited in claim 4, wherein each of said four silicon rubber chair leg tips is manually adjustable by rotating along each said 3/8" diameter threaded rod) to make the pickup trunk fit into the flatbed and against both sidewalls of the pickup truck.

6. The pickup trunk as recited in claim 4, wherein the total length between rubber chair leg tips can be adjusted from 54 inches into 63 inches.

7. The pickup trunk as recited in claim 1, wherein the base holder may measure approximately 52 1/8" length by 19 1/2" inches in width.

8. The pickup trunk as recited in claim 1, wherein the base holder is consisting of from ¾" square tube steel, ½" tube steel, or ¾" round tube steel.

\* \* \* \* \*